United States Patent [19]
Durgin et al.

[11] Patent Number: 6,050,079
[45] Date of Patent: Apr. 18, 2000

[54] MODULATED TURBINE COOLING SYSTEM

[75] Inventors: George A. Durgin, West Chester; Randall C. Bauer, Loveland; Ching-Pang Lee, Cincinnati, all of Ohio

[73] Assignee: General Electric Company, Cincinnati, Ohio

[21] Appl. No.: 08/997,980

[22] Filed: Dec. 24, 1997

[51] Int. Cl.$^7$ .................................. F02C 7/12; F01D 1/00
[52] U.S. Cl. ...................... 60/39.07; 60/39.29; 60/39.75; 415/115
[58] Field of Search ................................. 60/39.75, 39.83, 60/39.29, 39.07; 415/115, 116, 117

[56] References Cited

U.S. PATENT DOCUMENTS

| | | | |
|---|---|---|---|
| 4,882,902 | 11/1989 | Reigel et al. | 60/39.75 |
| 5,327,719 | 7/1994 | Mazeaud et al. | 60/39.75 |
| 5,555,721 | 9/1996 | Bourneuf et al. | 60/39.75 |

*Primary Examiner*—Ted Kim
*Attorney, Agent, or Firm*—Andrew C. Hess; Rodney M. Young

[57] ABSTRACT

A modulated flow transfer apparatus for transferring a fluid flow from a static element to a rotor of a gas turbine engine has an annular static inducer for accelerating the fluid flow in a substantially circumferential direction. The inducer has an annular row of identical first and second flow passages with first and second inlets respectively and outlets. First and second flow means direct first and second portions of the flow to the first and second flow passages, respectively. A valve is used for selectively modulating the second portion of the flow which together with a controller may be used for selectively preventing the second portion of flow from flowing through the second flow passages during a first cruise of engine operation and allowing substantially unrestricted flow therethrough during a takeoff mode of engine operation. The second flow means preferably includes an inducer manifold disposed between the valve and the second inlets. Exhaust ducts connect corresponding ones of the second inlets to the inducer manifold. The inducer manifold is preferably disposed inside a plenum used to feed cooling air to the first passages.

20 Claims, 5 Drawing Sheets

MODULATED TURBINE COOLING SYSTEM

BACKGROUND OF THE INVENTION

1. Field of the Invention

The present invention relates to the cooling of turbine rotor components in a gas turbine engine and, more particularly, to a modulating cooling flow through a single circumferential row of inducers for modulating the cooling air flow to such turbine rotor components.

2. Discussion of the Background Art

Gas turbine engines typically include cooling systems which provide cooling air to turbine rotor components, such as turbine blades, in order to limit the temperatures experienced by such components. Prior art cooling systems usually acquire the air used to cool turbine components from the engine's compressor, after which it is diverted and subsequently directed to the turbine section of the engine through an axial passageway. A device commonly known as an inducer is generally located at the exit end of such an axial passageway in order to accelerate and direct the airflow tangential to and in the same direction of the rotating rotor. Such inducers, frequently in the form of a circumferentially disposed array of vanes, are used to control the tangential speed and direction of the airflow so that it is substantially equal to that of the turbine rotor. An exemplary inducer utilized for such purpose is disclosed in U.S. Pat. No. 4,882,902 to James R. Reigel et al., entitled "Turbine Cooling Air Transferring Apparatus". Another inducer performing a similar function to the vane-type inducer is disclosed in U.S. Pat. No. 5,245,821 to Theodore T. Thomas Jr. et al. entitled "Stator to Rotor Flow Inducer," where a plurality of cylindrical airflow passages are disposed circumferentially about the engine centerline and includes cooling airflow holes or passages that are acutely angled in a tangential manner to the rotational direction of the rotor. The passages include a downstream angled outlet in the form of an open channel that is angled in a rotational direction of the rotor and has a back wall that is at a small acute angle with respect to a plane perpendicular to a centerline of the rotor.

An important factor in the design of cooling systems is its relationship to the efficiency of the gas turbine engine. In current prior art systems, the amount of cooling flow is generally fixed at a level required to achieve requisite cooling at the maximum turbine inlet temperature point for the engine. Since an engine is usually run at conditions which are less than maximum turbine inlet temperature, this causes the engine to normally operate with excess cooling flow and decreased efficiency. This excess cooling also has the effect of increasing overall engine specific fuel consumption. Accordingly, an apparatus capable of modulating the flow of cooling air through an inducer to the turbine rotor in accordance with the engine cycle requirements would increase the efficiency of the gas turbine engine and be most desirable.

Modulated turbine rotor cooling systems incorporating such inducers are disclosed in U.S. Pat. Nos. 4,462,204, 4,807,433, and 5,575,616, which provide both a modulated circumferential row and unmodulated circumferential row of inducers disposed radially inward and outward of each other respectively. These systems, however, are inefficient because they modulate the airflow through two different circumferential rows of inducers which adds to construction costs and design complexity. The inner and outer circumferential rows of inducers have different flow conditions and face different tangential velocities of the rotor at their exits. This results in inefficiency and compromises in design which lowers the overall efficiency of the modulated turbine rotor and inducer cooling system. The cooling system in U.S. Pat. No. 4,807,433 uses the same source of air with radially inner and outer plenums and inducers. The radially inner and outer inducers would have different dimensions and shapes. It is difficult to design these inducers to avoid mismatch of airflow conditions along the boundary of the cooling air exiting the inducers. This in turn could cause turbulence along the interface of the two exit airflows which in turn would reduce the efficiency improvement which the invention is designed for. This problem becomes more significant as the engine is operated farther away from design conditions. Consequently, there exists an unfulfilled need for an apparatus which modulates the flow of cooling air to the turbine at the exit of the cooling flow system in a more efficient and cost effective manner. The present invention address this need, in its preferred embodiment, by providing a single circumferential row of inducer passages having a portion of inducer passages fed by an independently modulated source of cooling air.

SUMMARY OF THE INVENTION

A modulated flow transfer apparatus for transferring a fluid flow from a static element to a rotor of a gas turbine engine has an annular static inducer for accelerating the fluid flow in a substantially circumferential direction and the inducer has an annular row of identical first and second flow passages, each of the flow passages having had an inlet and an outlet. The apparatus further includes a first flow means for directing a first portion of the flow to first inlets of the first flow passages and a second flow means for directing a second portion of the flow to second inlets of the second flow passages. A valve is used for selectively modulating the second portion of the flow. A controller may be used to control the valve such that controller and the valve are operable for selectively preventing the second portion of flow from flowing through the second inlets of the second flow passages during a first cruise of engine operation and allowing substantially unrestricted flow therethrough during a takeoff mode of engine operation.

The second flow means preferably includes an inducer manifold disposed between the valve and the second inlets of the second flow passages and the inducer manifold may include exhaust ducts, each one of which connects a corresponding one of the second inlets of the second flow passages to the inducer manifold. The first flow means preferably further includes an annular plenum that has a manifold inlet in fluid communication with a source of the fluid flow and an exhaust means that includes the first inlets of the first flow passages during engine operation. The inducer manifold is preferably annular and pressure sealed against and disposed within the plenum. The inducer manifold may include at least one set of first attached sectors such that each one of the exhaust ducts connects a corresponding one of the first inlets to one of the first sectors. Each of the sectors may have a constant sector cross-section and each annularly successive sector downstream of the manifold inlet may have a cross-sectional sector area less than that of an annularly preceding sector. The cross-sectional sector areas are preferably such that flow through each of the inlets is equal. Each of the flow passages may have a downstream angled outlet generally angled in a rotational direction of the rotor and the angled outlet includes an open channel having a back wall that is acutely angled with respect to a plane perpendicular to a centerline of the rotor.

The first and second flow means are preferably connected in fluid flow communication to at least one source of compressor air in a compressor of the engine such as a single source of compressor discharge air in a compressor of the engine. Preferably, the valve is located outside of an outer compressor casing of the compressor, the second flow means includes first tubing connecting the source of compressed air to the valve, and the second flow means includes second tubing connecting the valve to the inducer manifold.

The apparatus may further include a turbo-cooler disposed between the source of compressed air and the inducer manifold. The turbo-cooler preferably includes an inter-cooled turbo-charger and is controlled by a two stage valve. The turbo-charger includes a turbo-compressor drivenly connected to an air-turbine and the two stage valve has a first stage in air supply communication with the air-turbine and a second stage in air supply communication with the turbo-compressor. An intercooler, preferably having an air-fuel heat exchanger, is disposed between the second stage and the turbo-compressor.

ADVANTAGES OF THE INVENTION

The present invention has the advantage of being able to modulate the airflow through a single circumferential row of inducers which provides inexpensive reduced design and production costs and reduces design complexity as compared to prior art modulated inducer systems while still providing the efficiency due to the ability to shut down airflow through a portion of the inducers. The present invention has the advantage of eliminating different flow conditions between inner and outer rows of inducers found in the prior art that result in inefficiency and compromises in design which lowers the overall efficiency of the modulated turbine rotor and inducer cooling system. More specifically the present invention avoids mismatch of airflow conditions along the boundary of the cooling air exiting the inner and outer circumferential rows of inducers found in the prior art. The present invention has the advantage of being able to operate more efficiently at off design conditions.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
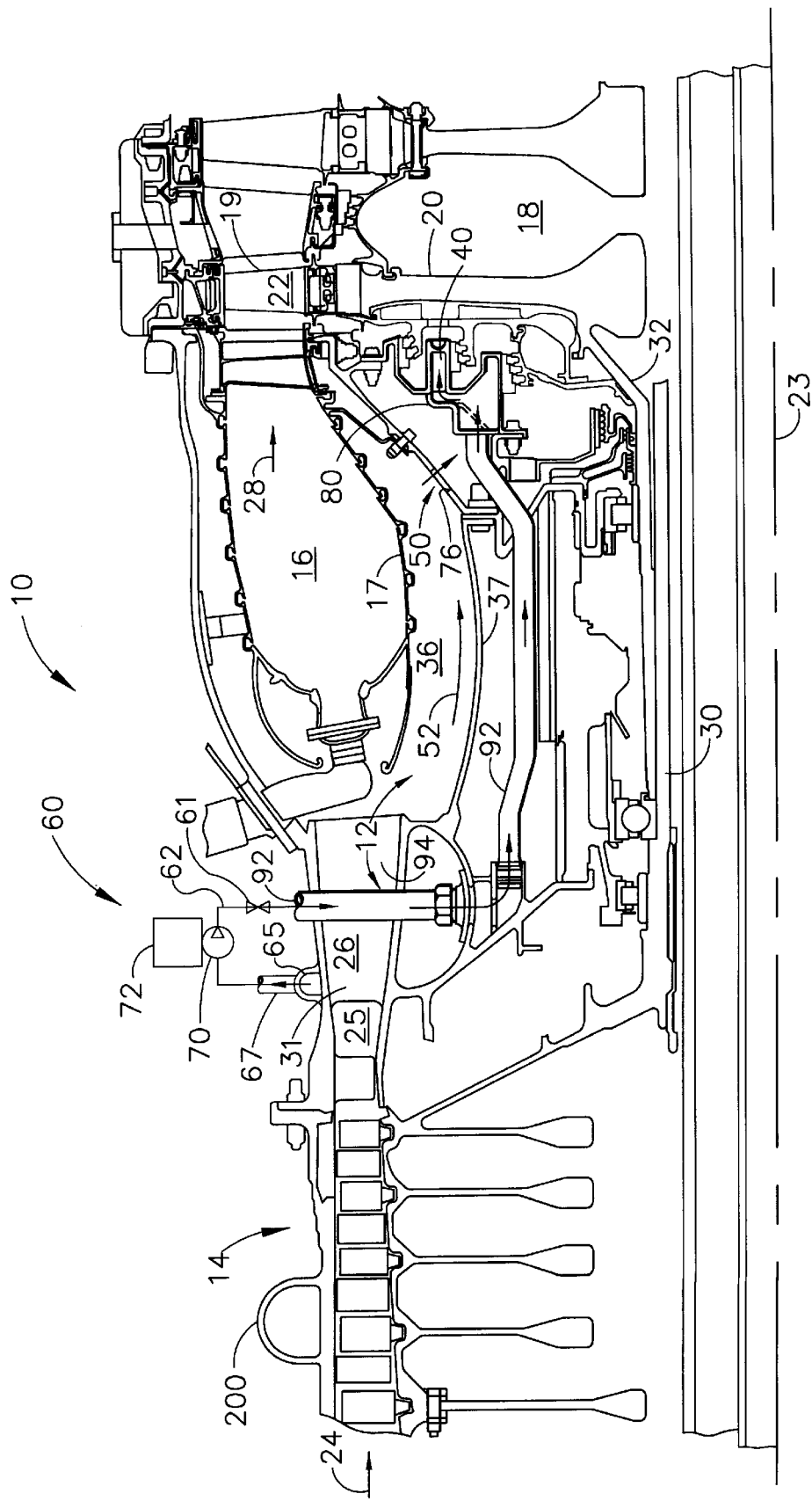
FIG. 1 is a partial, enlarged cross-sectional view of a high pressure section of a gas turbine engine including a compressor discharge section, a combustor and a high pressure turbine portions together with a turbine cooling flow modulation system in accordance with the present invention.
Figure 2:
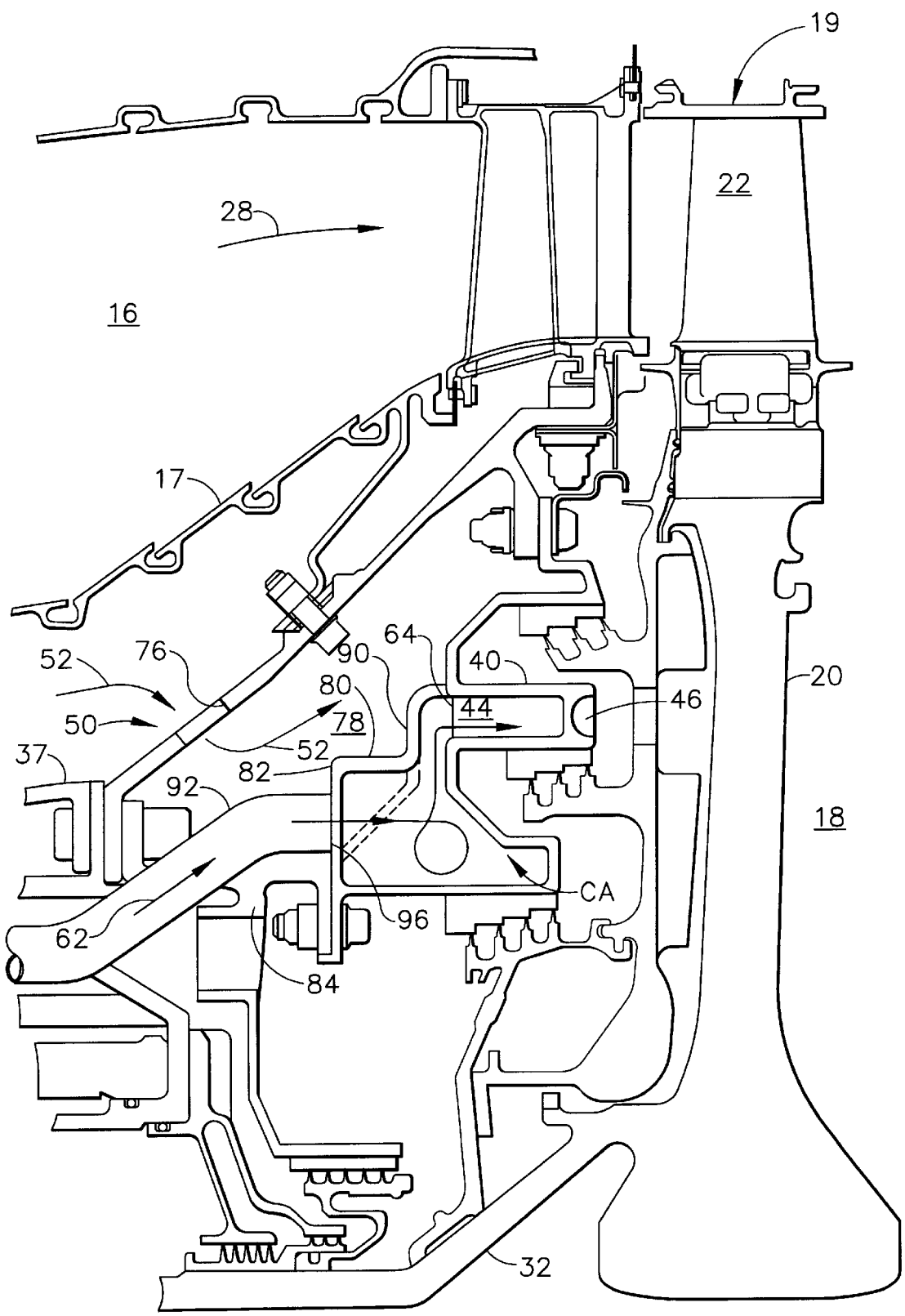
FIG. 2 is an enlarged cross-sectional view of a part of the engine in FIG. 1 that illustrates the inducers and plenum and inducer manifolds that feed cooling air to the inducers.
Figure 3:
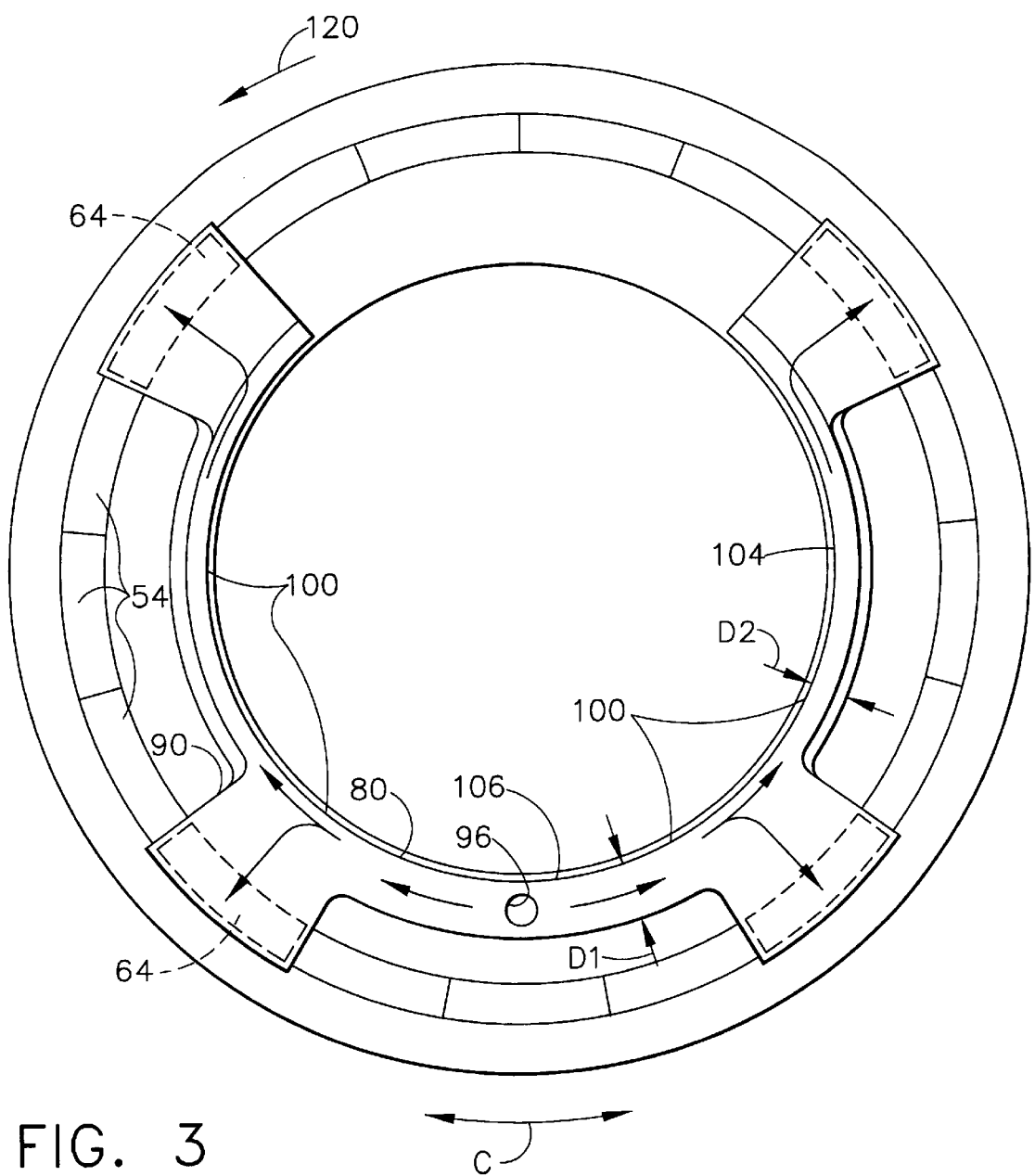
FIG. 3 is an elevational view in the axial direction of the inducer manifold and inducers in FIG. 2 illustrating first and second inducer inlets and an inner inducer manifold which feeds the second inducer inlets.

Illustrated in FIGS. 1 and 2 is a portion of an axial flow gas turbine engine 10 including a modulated flow transfer apparatus, generally indicated at 12, according to an exemplary embodiment of the present invention. The engine 10 includes in serial flow relationship a high pressure compressor 14, a combustor 16, and a high pressure turbine 18 including a high pressure turbine first stage 19 rotor disk 20 having a plurality of circumferentially spaced turbine blades 22 extending radially outwardly therefrom and disposed around a centerline 23 of the engine 10. The high pressure turbine rotor disk 20 represents a hot section of the rotor that the present invention is designed to cool in a controlled modulated manner.

In conventional operation, air 24 is pressurized by the compressor 14 and then discharged at a compressor discharge 25 where the air is referred to as compressor discharge pressure air or CDP air which then passes through a diffuser 26. A major portion of the air 24 is then suitably channeled into the combustor 16 where it is mixed with fuel for generating relatively high pressure combustion gases 28 which flow to the high pressure turbine 18 for providing power to the compressor 14 through an interconnecting shaft 30. The combustion gases 28 then pass through a low pressure turbine (not shown), which provides power to a fan (not shown) and are then discharged from the engine 10. A radially inner annular combustor duct 36 is formed between a combustor liner 17 and a more radially inward casing 37 of the combustor 16.

The gas turbine engine 10 typically operates under various modes of operation. For example, the engine 10 can operate under first and second modes of operation which correspond with relatively low and high power output levels thereof such as cruise and takeoff, respectively. During takeoff, the engine 10 is effective for generating relatively large thrust output as compared to a relative small amount of thrust output generated during cruise operation.

Inasmuch as the temperature of the combustion gases 28 is significantly higher during takeoff than during cruise, cooling air is typically provided for reducing the temperatures experienced by a relatively hot rotor 32 which, typically includes the rotor disk 20 and the turbine blades 22. However, for increasing the overall efficiency of the engine 10 during operation, cooling air such as CDP air must be efficiently channeled to the rotor 32 and only in the amounts needed for cooling during the various modes of operation.

The modulated flow transfer apparatus 12 is used to transfer cooling air 31, a fluid flow, from a static element of the compressor which serves as source of cooling flow to the rotor 32 and more particularly to the rotor disk 20. An annular static inducer 40 is used for accelerating the cooling air in a substantially circumferential direction C. The inducer 40 has an annular row of identical first and second flow passages 41 and 42. Each of the flow passages 41 and 42 has an inducer inlet 44 and an inducer outlet 46. A first flow means generally indicated at 50 directs a first portion 52 of the CDP air to first inlets 54 of the flow passages 41. A second flow means generally indicated at 60 directs a CDP air second portion 62 to second inlets 64 of the second flow passages 42. A CDP air bleed manifold 65 is used to bleed CDP air at the compressor discharge 25 and first tubing 67 is used to direct the CDP air second portion 62 from the bleed manifold to a first valve 70 which is used for selectively modulating the flow of the CDP air second portion and second tubing 92 is used to direct the CDP air second portion from the first valve to the inducer manifold 80. A controller 72 may be used to control the first valve 70 so as to selectively prevent the second portion 62 from flowing through the second inlets 64 during a first mode of engine operation such as cruise and allowing substantially unrestricted flow therethrough during a second mode of engine operation such as takeoff. The modulating first valve 70 is fail safed in an open position and provides the pressurized second portion 62 of CDP air to an inducer manifold 80 from where it is distributed to the second inlets 64 when the valve is open. A check valve 61 is disposed along the second tubing 92 prior to the second tubing entering compressor rear frame struts 94 to prevent leakage in case of a line failure or leak.

The first flow means 50 includes a flowpath which allows the first portion 52 to flow from the diffuser 26 through the radially inner annular combustor duct 36 and through intake apertures 76 in the casing 37. An annular plenum 78 formed in part between the casing 37 and the inducer 40 employs the intake apertures 76 to receive the first portion 52 of the CDP air and exhausts the first portion through the first inlets 54. The second flow means preferably includes the inducer manifold 80 disposed between the first valve 70 and the second inlets 64 and preferably within the annular plenum 78. The inducer manifold 80 may be partially formed by an easy to form sheet metal structure 82 that is welded or otherwise attached to the inducer 40 and surrounding static structure 84 of the engine.

Figure 4:
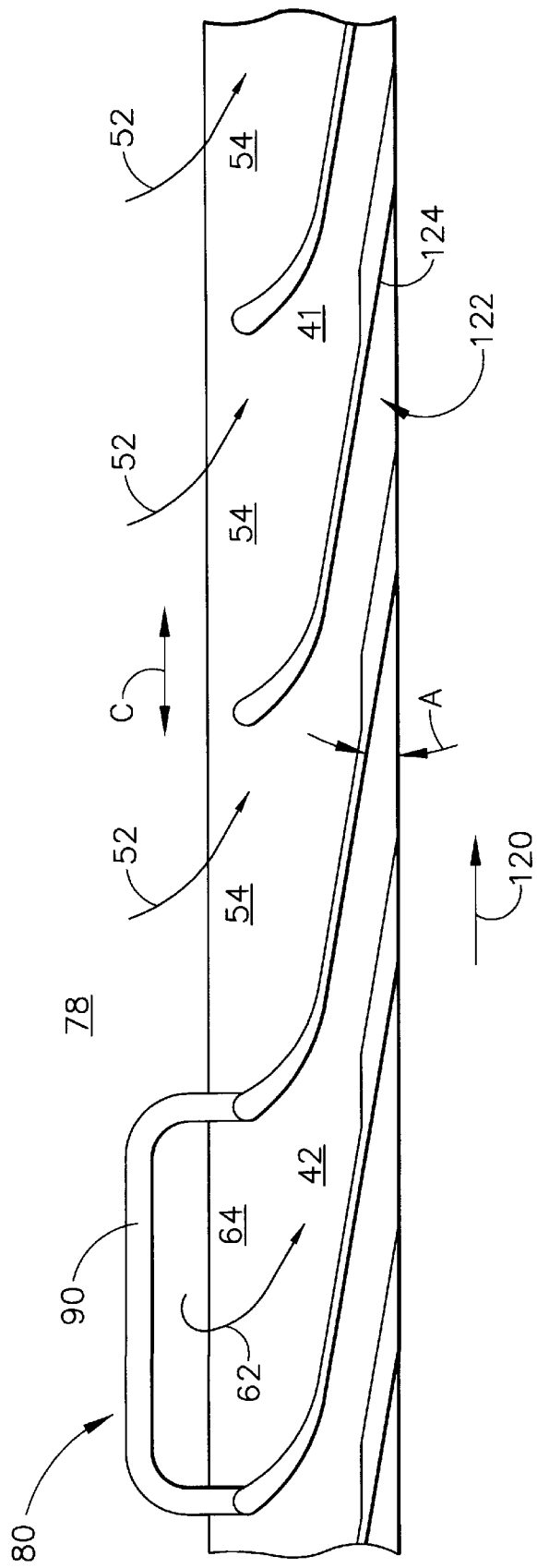
FIG. 4 is a cross-sectional layed out view of the inducer and some flow passages illustrated in FIGS. 1 and 2.

Referring further to FIG. 4, the second flow passages 42 are each individually fed cooling air from the inducer manifold 80 by a plurality of exhaust ducts 90. Each one of the exhaust ducts 90 connects a corresponding one of the second inlets 64 to the inducer manifold 80. The second tubing 92 from the first valve 70 is preferably routed radially inward through the compressor rear frame struts 94 and to the inducer manifold 80 preferably to a centrally located manifold inlet 96 which is a preferred embodiment for an intake for the inducer manifold. The inducer manifold 80 is preferably annular and pressure sealed against and disposed within the plenum 78. The inducer manifold 80 preferably has at least two sets of attached sectors 100 such that each one of the exhaust ducts 90 connects a corresponding one of the second inlets 64 to one of the sectors 100. Each of the sets extends annularly, one clockwise and the other counter-clockwise, from the centrally located manifold inlet 96. Each of the sectors 100 preferably has a constant sector cross-section as represented by its cross-sectional area CA and each annularly successive sector 104 downstream of the manifold inlet 96 has a cross-sectional sector area less than that of an annularly preceding sector 106 as represented by first manifold height D1 of the annularly preceding sector and second manifold height D2 of the annularly successive sector. The cross-sectional sector areas of the annularly successive and preceding sectors 104 and 106, respectively, are preferably such that flow through each of the inlets is equal which is a ratio of about 2 to 1.

The first and second flow passages 41 and 42 more particularly illustrated in FIG. 4 are designed to be highly efficient and preferably the inducer outlets 46 are acutely angled downstream in a rotational direction 120 of the rotor disk 20. Each of the angled inducer outlets 46 includes an open channel 122 having a back wall 124 that is angled at a small acute angle A to a plane perpendicular to a centerline 23 of the rotor disk 20 and its rotor.

Figure 5:
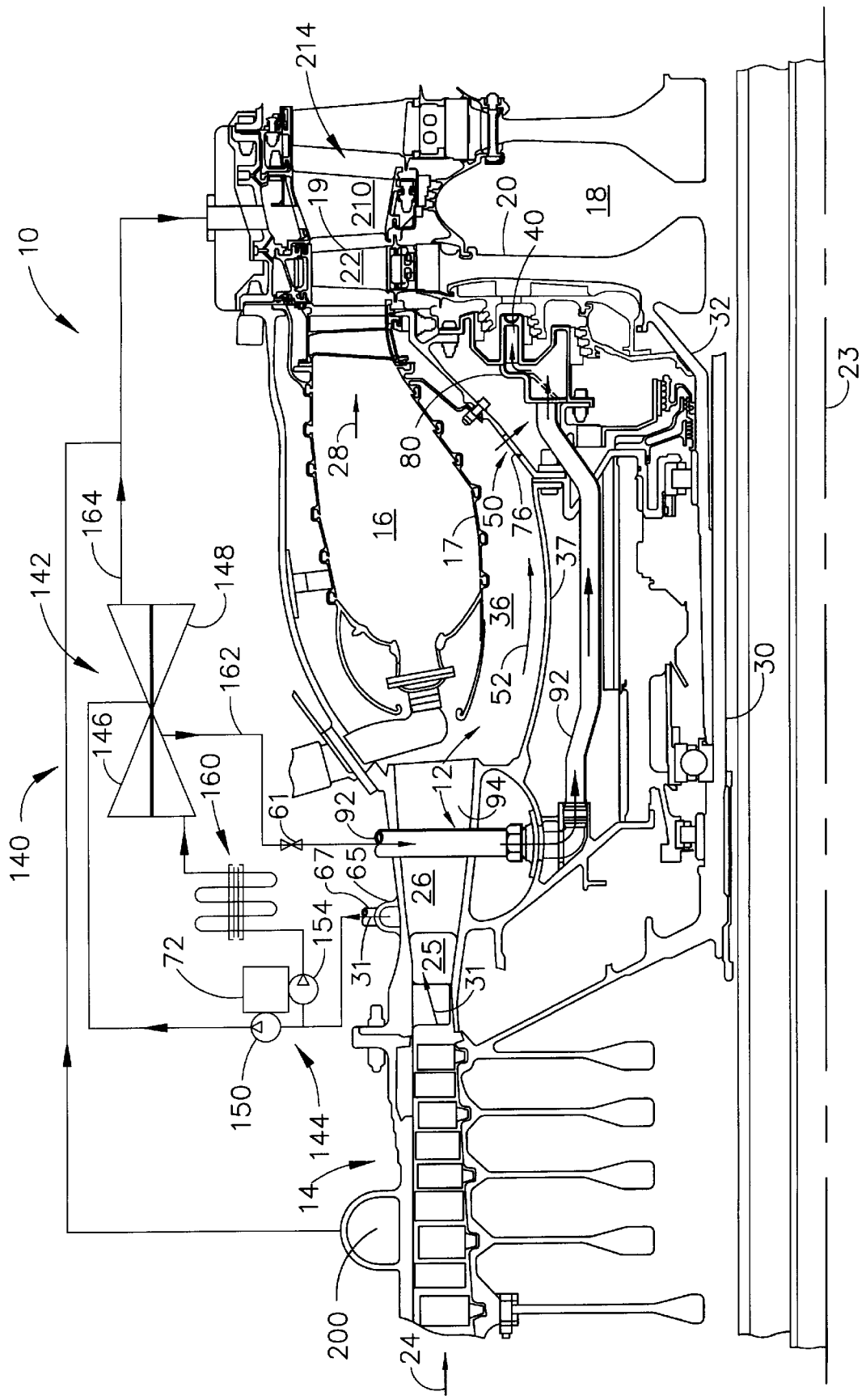
FIG. 5 is a partial, enlarged cross-sectional view of a high pressure section of a gas turbine engine including a compressor discharge section, a combustor and a high pressure turbine portions together with a turbine cooling flow modulation system in accordance with the an alternative turbine cooling flow modulation system of the present invention.

Illustrated in FIG. 5 is an alternative embodiment of the present invention which further includes a turbo-cooler 140 disposed between the CDP air bleed manifold 65 which serves as a source of compressed air for cooling. The turbo-cooler 140 includes an intercooled turbo-charger 142 and is controlled by a two stage valve 144. The turbo-cooler 140 includes a turbo-compressor 146 drivenly connected to an air turbine 148. The two stage valve 144 has a first stage 150 in air supply communication with the air-turbine 148 and a second stage 154 in air supply communication with the turbo-compressor 146. The controller 72 may also be used to control the first and second stages 150 and 154 and the amount of compressed cooling air 31 passing through each. An intercooler 160, preferably employing an air-fuel heat exchanger, is disposed between the second stage 154 and the turbo-compressor 146. Boosted air 162 exits the turbo-compressor 146 and is fed to the inducer manifold 80 by the second tubing 92. Effluent or turbine exit air 164 from the air-turbine 148 has a pressure that is higher than that of components in the same parts of the turbine. The turbine exit air 164 can be used to supplement cooling air from a lower compressor stage, as compared to the compressor discharge 25, used to cool a turbine stage operating at a lower pressure than that which the inducer 40 is used to cool. The exemplary embodiment illustrated herein may have a 14 stage high pressure compressor such as that found in a General Electric CF6-80C2 engine and uses 11th stage compressor air 200 to cool a turbine nozzle 210 in a second stage 214 of the high pressure turbine 18. The turbo-cooler provides an additional advantage that counters and overcomes its additional weight and cost. The turbo-cooler provides cooler air to the turbine and therefore allows the turbine to run cooler than without the turbo-cooler. The turbine may therefore be built smaller and lighter to accommodate takeoff conditions.

While the preferred embodiment of our invention has been described fully in order to explain its principles, it is understood that various modifications or alterations may be made to the preferred embodiment without departing from the scope of the invention as set forth in the appended claims.

We claim:

1. A modulated flow transfer apparatus for transferring a fluid flow from a static element to a rotor of a gas turbine engine, said apparatus comprising:

an annular static inducer for accelerating the fluid flow in a substantially circumferential direction;

said inducer having an annular row of identical first and second flow passages with first and second inlets respectively;

a first flow means for directing a first portion of the flow to said first inlets;

a second flow means for directing a second portion of the flow to said second inlets; and a valve for selectively modulating said second portion of the flow.

2. An apparatus as claimed in claim 1 further comprising a controller to control said valve wherein said controller and said valve are operable for selectively preventing said second portion of flow from flowing through said second inlets during a cruise mode of engine operation and allowing substantially unrestricted flow therethrough during a takeoff mode of engine operation.

3. An apparatus as claimed in claim 1, said second flow means further comprising an inducer manifold disposed between said valve and said second inlets;

said inducer manifold including a manifold inlet in fluid communication with said valve and a plurality of exhaust ducts; and each one of said exhaust ducts connecting one of said second inlets to said inducer manifold.

4. An apparatus as claimed in claim 3, said first flow means further comprising an annular plenum having an intake in fluid communication with a source of the fluid flow and an exhaust means comprising said first inlets.

5. An apparatus as claimed in claim 4 wherein said inducer manifold is annular and pressure sealed against and disposed within said plenum.

6. An apparatus as claimed in claim 5 wherein said inducer manifold includes at least a first plurality of attached sectors and each one of said exhaust ducts connects a corresponding one of said second inlets to one of said sectors.

7. An apparatus as claimed in claim 6 wherein said each of said sectors has a constant sector cross-section and each annularly successive sector downstream of said manifold inlet has a cross-sectional sector area less than that of an annularly preceding sector.

8. An apparatus as claimed in claim 7 further comprising said cross-sectional sector areas having sizes such that flow through each of said second inlets is equal.

9. An apparatus as claimed in claim 8 further comprising:

said outlets being acutely angled downstream in a rotational direction of the rotor;

each of said angled outlets including an open channel; and said channel having a back wall that is acutely angled with respect to a plane perpendicular to a centerline of the rotor.

10. An apparatus as claimed in claim 9 wherein said first and second flow means are connected in fluid flow communication to at least one source of compressor air in a compressor of the engine.

11. An apparatus as claimed in claim 9 wherein said first and second flow means are connected in fluid flow communication to a single source of compressor discharge air in a compressor of the engine.

12. An apparatus as claimed in claim 5 further comprising:

said valve located outside of an outer compressor casing of said compressor;

said second flow means including first tubing connecting a source of compressed air to said valve; and said second flow means including second tubing connecting said valve to said inducer manifold.

13. An apparatus as claimed in claim 12, said inducer manifold further comprising at least a first plurality of attached sectors;

each one of said plurality of exhaust ducts connecting a corresponding one of said second inlets to one of said first plurality of said sectors;

said sectors each having a constant cross-section; and each annularly successive sector downstream of said manifold inlet has a cross-sectional sector area less than that of an annularly preceding sector.

14. An apparatus as claimed in claim 13 further comprising said cross-sectional sector areas being sized such that flow through each of said second inlets is equal.

15. An apparatus as claimed in claim 14 further comprising:

said outlets being acutely angled downstream in a rotational direction of the rotor;

each of said angled outlets including an open channel; and said channel having a back wall that is acutely angled with respect to a plane perpendicular to a centerline of the rotor.

16. An apparatus as claimed in claim 15 wherein said first and second flow means are connected in fluid flow communication to said source of compressed air which is a source of compressor discharge air from a compressor of the engine.

17. An apparatus as claimed in claim 12 further comprising a turbo-cooler disposed between said source of compressed air and inducer manifold, said turbo-cooler comprising:

a turbo-charger controlled by said valve;

said turbo-charger having a turbo-compressor drivenly connected to an air-turbine;

said valve is a two stage valve having a first stage in air supply communication with said air-turbine and a second stage in air supply communication with said turbo-compressor; and an intercooler disposed between said second stage and said turbo-compressor.

18. An apparatus as claimed in claim 17, said inducer manifold further comprising:

at least a first plurality of attached sectors;

each one of said exhaust ducts connecting a corresponding one of said second inlets to one of said first plurality of said sectors;

said sectors each having a constant cross-section;

each annularly successive sector downstream of said manifold inlet has a cross-sectional area less than that of an annularly preceding sector; and said each of said sectors has a cross-sectional area sized such that flow through each of said second inlets is equal.

19. An apparatus as claimed in claim 18 further comprising:

said first and second flow means connected in fluid flow communication to said source of compressed air which is a source of compressor discharge air of a compressor of the engine; and said air-turbine having an exhaust cooling means for supplying exhaust air from a turbine exit of said air-turbine to at least one cooled turbine element of the engine.

20. An apparatus as claimed in claim 19 further comprising:

each of said flow passages including a downstream angled outlet angled in a rotational direction of the rotor;

said angled outlet including an open channel; and said channel having a back wall that is at a small acute angle with respect to a plane perpendicular to a centerline of the rotor.

* * * * *